Aug. 13, 1935.   W. R. GRISWOLD   2,011,243

VALVE MECHANISM

Filed Jan. 31, 1933

Inventor
WALTER R. GRISWOLD.
By
Attorney

Patented Aug. 13, 1935

2,011,243

UNITED STATES PATENT OFFICE 2,011,243

VALVE MECHANISM

Walter R. Griswold, Detroit, Mich., assignor to Packard Motor Car Company, Detroit, Mich., a corporation of Michigan Application January 31, 1933, Serial No. 654,490

9 Claims. (Cl. 137—139)

This invention relates to valve mechanism and more particularly to valve control mechanism.

In some valve mechanisms, the valve element is held in open position by resilient means and is moved to closed position by a pendulum type of inertia means which is responsive to sudden movements of the valve mechanism or the device with which it is associated. Such valve mechanism is employed, for example, as a bleed for vacuum operated clutch mechanism for motor vehicles.

The inertia means is usually pivotally mounted and connected to move the valve element into closed position upon changing position angularly on its mounting. Inclination of the vehicle or the device with which the valve mechanism is associated will shift the inertia member angularly on its mounting and will shut the valve without the impetus of sudden movement, and this effect is obviously undesirable.

An object of my invention is to provide a new and improved form of inertia controlled valve mechanism which will function to actuate the valve element only upon sudden movement.

Another object of my invention is to provide a valve regulating mechanism in which a pendulum inertia control member can be shifted, as to its inclination, without actuating a valve element with which it is connected.

A further object of my invention is to provide an actuator for a valve which is responsive only to inertia in shifting the valve position.

Other objects of the invention will appear from the following description taken in connection with the drawing, which forms a part of this specification, and in which.

Figure 1:
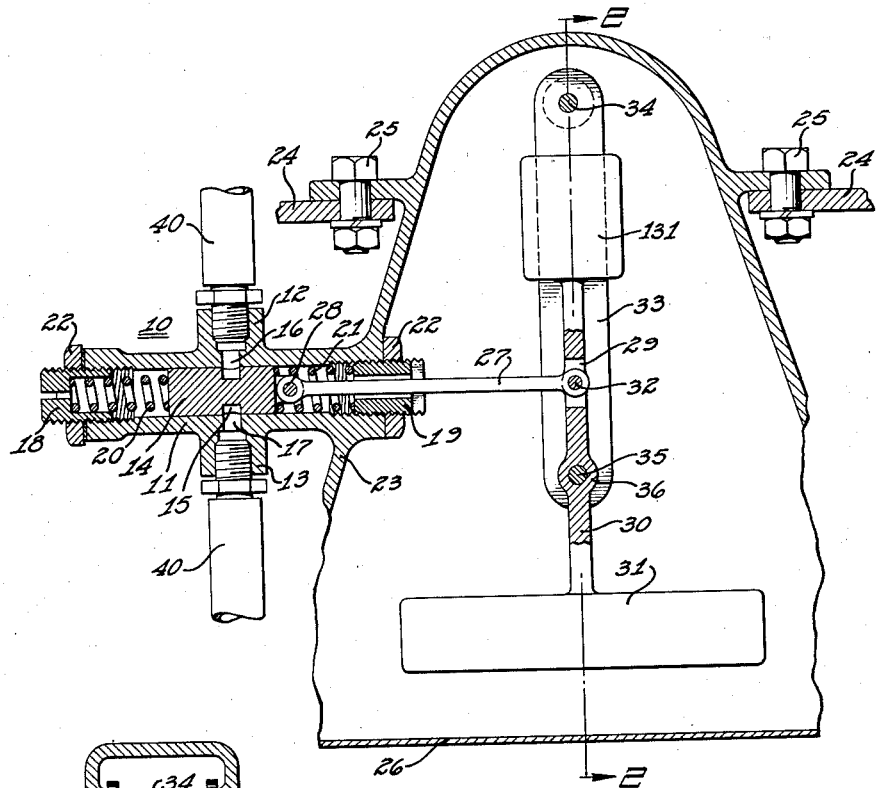
Fig. 1 is a vertical sectional view of a valve mechanism incorporating my invention.
Figure 2:
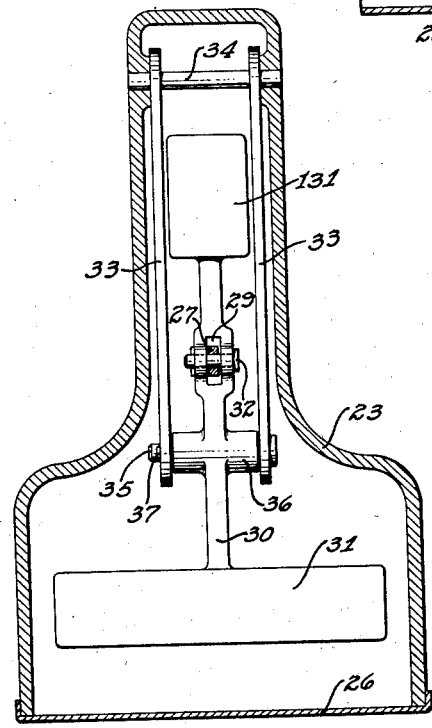
Fig. 2 is a sectional view of the same taken on line 2—2 of Fig. 1.

Referring now to the drawing by characters of reference, 10 represents generally a valve mechanism in which there is a cylindrical casing 11 having an inlet boss 12 and an outlet boss 13. In the casing is mounted a piston valve element 14 having a peripheral groove 15 adapted to register with a passage 16 leading through the inlet boss and a passage 17 leading through the outlet boss.

A hollow cap 18 screws into one end of the casing and a sleeve 19 screws into the other end of the casing. Coil spring 20 extends between the valve element and the cap and coil spring 21 extends between the valve element and the sleeve. These springs are arranged to normally maintain the valve element in a position in the casing where the groove 15 will establish wide open communication between the inlet and outlet passages 16 and 17. Suitable lock nuts 22 are screwed on the sleeve and cap into engagement with the casing to secure desired adjustment of the springs.

The valve casing is fixed to a housing 23 which is mounted upon a support 24 and secured thereto by suitable means, such as bolts 25. One end of the housing is enclosed by a detachable cover 26, thus allowing access to the inertia valve regulating mechanism mounted within the housing.

In order to move the valve element into closed position, there is a rod 27 which extends through sleeve 19 and is pivotally connected to ears extending from the valve element, as indicated at 28. The other end of the rod, which projects into the housing, extends into a slot 29 in the shank 30 of an inertia member which has enlarged end portions 31 and 131. This rod end is pivotally mounted on a pin 32 which extends across the slot and is fixed in the shank. Spaced links 33 hang from a pin 34 fixed to and extending across the top portion of the housing. A headed pin 35 extends through a hub portion 36 of the shank of the inertia member and is carried by the lower ends of the links through which it extends, a cotter key 37 fixing the pin axially. The inertia member is pivotally mounted on the pin 35 which is suspended by the links, and the center of gravity of the inertia member is at its point of pivot.

The operation of the inertia device depends on the polar movement of inertia forces about the pin 35. When the housing is in an angular position, the links 33 can slowly take inclined positions without the inertia member changing its relative position, and thus the valve will remain open even though the housing is inclined since the springs 20 and 21 will tend to maintain the static equilibrium positions.

Upon the application of sudden forces to the housing, the links 33 and the inertia member will act as a combination simple pendulum and torsion pendulum. Swinging of the pivot 35 by a force sufficient to overcome the resistance of the springs will move the valve rod axially into position such that the groove no longer connects the passages 16 and 17, thus shutting off flow. This occurs because any forces which would rotate the inertia member to maintain the pivot 32 stationary must be supplied by the valve and the resistance of its associated springs. The springs are purposely proportioned so that they will not have sufficient tension to cause such rotational effect on the inertia member, thus allowing axial displacement of the valve, according to any predetermined plan of force applied to the housing.

It will be seen that the inertia member will not be shifted to move the valve upon inclination of the housing, but will shift its position to actuate the valve upon a predetermined sudden movement of the housing sufficient to overcome the resistance of the springs. This device can be applied to various regulating systems where flow control is desired and, for this purpose, pipes 40 are connected with the inlet and outlet passages 16 and 17. Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. Valve mechanism comprising a valve element, resilient means associated to normally maintain the valve element in a predetermined position, an inertia member connected to move the valve, and suspended supporting means on which the inertia member is movably mounted.

2. Valve mechanism comprising an axially movable valve element, resilient means associated to normally maintain the valve element in a predetermined position axially, an inertia member connected to move the valve axially, and suspended link members to which the inertia member is pivoted.

3. Valve mechanism comprising an axially movable valve element, resilient means associated to normally maintain the valve element in open position, an inertia member, suspended means to which the inertia member is pivoted at its center of gravity, and a connector between an arm of the inertia member and the valve element, said inertia member actuating the connector to close the valve only upon sudden movement of the mechanism.

4. In combination with a valve having a valve element normally held in open position axially by resilient means, of regulating means comprising a rod extending axially from the valve element, a pair of suspended links between which the rod extends, and an inertia member intermediate the links to which the rod is pivotally connected, said inertia member being pivotally carried by the links.

5. Valve operating means comprising a valve actuator rod, an inertia member to which the rod is pivoted, said member extending substantially normal to the rod, a link member on each side of the inertia member, a pivot member for the upper end of said links, and a pivot member carried by the lower ends of the links on which the inertia member is pivoted at its center of gravity, said rod being pivoted to the inertia member between the pivot members.

6. Valve mechanism comprising a valve element resiliently held in a predetermined position axially, a housing, a rod pivoted to one end of the valve element and extending into the housing, a pivot pin in the top portion of the housing, a pair of spaced links suspended from the pivot pin, a pivot member carried by and extending between the links, and an inertia member mounted at its center of gravity on the pivot member and intermediate the links, the rod being pivoted to the inertia member above the center of gravity thereof.

7. In a valve device, regulating mechanism comprising an inertia member, control means pivoted to the inertia member, and a pendulum support to which the inertia member is pivoted, said pendulum support being swingable on its pivot to maintain the pivotal point of the control means stationary upon inclination of the valve device.

8. In a valve control device, a slidably mounted valve normally maintained in a predetermined position, inertia means pivotally connected to the valve, said inertia means being movable to shift the position of the valve upon sudden movements of the device, and pivoted means supporting said inertia means in a relation such that it is unresponsive to changes in the inclination of the device from normal position to shift the valve.

9. Valve mechanism comprising an adjustable valve element, means associated to normally maintain the valve element in a predetermined position of adjustment, an inertia member connected to adjust the valve, and supporting means for the inertia member, the position of said inertia member adjusting the position of the valve only in response to sudden movement of the supporting means.

WALTER R. GRISWOLD.